United States Patent

[11] 3,631,714

[72] Inventors Russell N. Cressman
Center Valley;
Walter J. Bantz, Allentown, both of Pa.
[21] Appl. No. 878,480
[22] Filed Nov. 20, 1969
[45] Patented Jan. 4, 1972
[73] Assignee Bethlehem Steel Corporation

[54] ULTRASONIC INSPECTION PROBE
4 Claims, 3 Drawing Figs.

[52] U.S. Cl. .................................................. 73/71.5,
73/67.8
[51] Int. Cl. .................................................. G01n 29/00
[50] Field of Search ........................................ 73/67.5-67.9,
71.5

[56] References Cited
UNITED STATES PATENTS

| | | | |
|---|---|---|---|
| 3,501,947 | 3/1970 | Hetherington | 73/71.5 |
| 3,534,591 | 10/1970 | Phelan | 73/71.5 X |
| 2,602,101 | 7/1952 | Mesh | 73/71.5 X |
| 3,028,751 | 4/1962 | Joy | 73/67.8 |
| 3,028,753 | 4/1962 | Joy | 73/67.8 |

OTHER REFERENCES

Last, A. J., " Focused Ultrasonic Emulsifiers and Dispersers," Ultrasonics, Apr. 1969, pp. 131

*Primary Examiner*—Richard C. Queisser
*Assistant Examiner*—Arthur E. Korkosz
*Attorney*—Joseph J. O'Keefe

ABSTRACT: A carriage is adapted to be moved relative to a flat workpiece during the ultrasonic inspection thereof. A housing containing a row of transducers in suspended from the carriage whereby, as the housing or carriage traverses undulations in the surface of the workpiece, the row of transducers is maintained horizontal and transversely disposed to the direction of movement of the carriage relative to the workpiece. In addition, the bottom of the housing is maintained at a constant distance from the workpiece, while the vertical axes of said transducers are maintained perpendicular to the plane of the workpiece.

The transducers are ultrasonically coupled to a column of water contained in said housing. A jet of water provides a continuous flow of water between the bottom of said housing and the flat surfaces of said workpiece oppositely disposed therefrom. The housing is supported relative to said flat surface such that there is sufficient surface tension to maintain a continuous layer of water between the opposing surfaces of said flat surfaces and said bottom.

PATENTED JAN 4 1972

3,631,714

INVENTORS
Russell N. Cressman
Walter J. Bantz

ULTRASONIC INSPECTION PROBE

BACKGROUND OF THE INVENTION

In the inspection of a workpiece by ultrasonic techniques, it is essential for the ultrasonic energy transmitted from a transducer to be efficaciously coupled to the workpiece. One fairly effective but relatively inefficient method of coupling comprises interposing a water column between, and in intimate contact with, both the transmitting face of the transducer and the surface of the workpiece. In the past, the means for performing this method generally comprised a container open at both ends. Water was introduced into one end of the container and flowed out of the other end. This coupling means, while fairly effective, suffered from three basic disadvantages. First, a relatively large quantity of water was required to maintain a continuous column of water between the transducer and the workpiece. Second, the rapid flow of water resulted in an excessive amount of air bubbles in the water column, such air bubbles causing false defect signals. Third, the areas of the workpiece adjacent the edges thereof could not be inspected, inasmuch as the column of water could not be maintained unless the entire column was oppositely disposed from the workpiece.

It is an object of this invention to provide an ultrasonic inspection probe in which a relatively small amount of coupling liquid is required. It is a further object to provide such a device in which there is a relatively small amount of air bubbles in the coupling liquid and which permits inspection of the workpiece substantially all the way to the edges thereof.

SUMMARY OF THE INVENTION

We have discovered that the foregoing objects can be obtained by providing a housing containing a first liquid to which a transducer is coupled, said housing having a closed end oppositely disposed from the transmitting face of said transducer. Said closed end has a cross section which substantially conforms to the surface of a workpiece to be ultrasonically inspected. Means, comprising a water jet, for example, is provided for supplying a second liquid between said closed end and the surface of said workpiece. Means is also provided for supporting the housing relative to the workpiece such that the distance between the surface thereof and the closed end is sufficiently small so that a continuous layer of the second liquid is maintained in contact with the opposing surfaces of said workpiece and said closed end. Preferably, said first and second liquids are water, and the surface of said workpiece and said closed end are substantially flat. Said closed end preferably comprises a film of a material having an acoustic impedance similar to that of water.

DESCRIPTION OF THE PREFERRED EMBODIMENT

Figure 1:
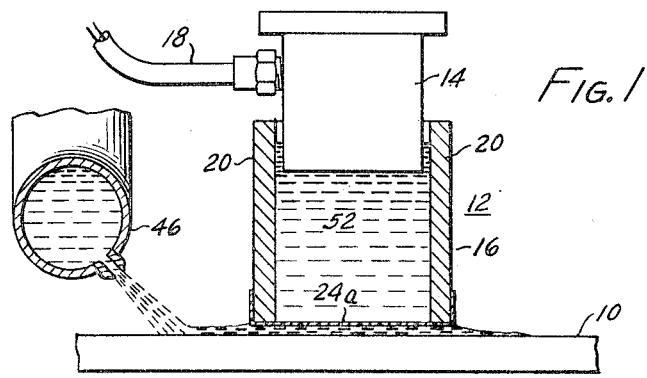
FIG. 1 is a diagrammatic view of a preferred embodiment of the ultrasonic inspection probe of the invention.
Figure 3:
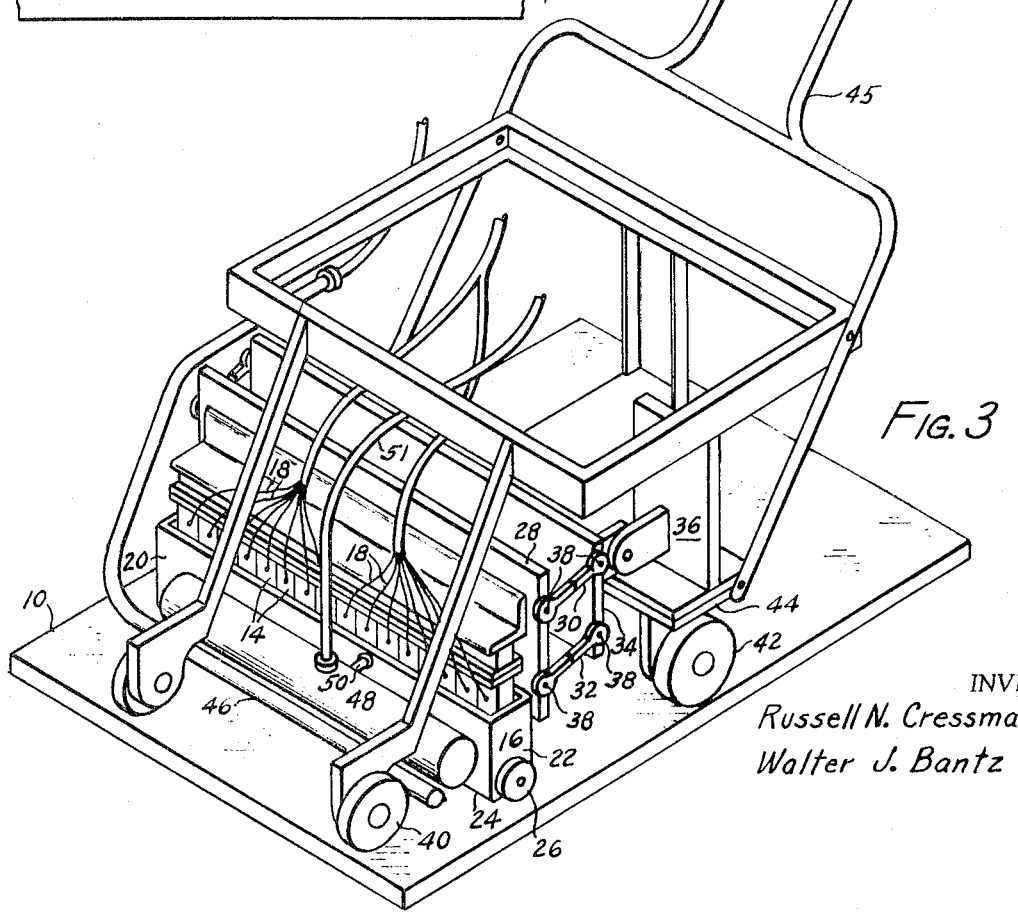
FIG. 3 is a diagrammatic perspective view showing the probe suspended from a carriage.

FIG. 1 shows a workpiece, e.g. a steel plate 10, ultrasonically coupled to an inspection probe broadly designated by the numeral 12. As shown in FIG. 3, said probe comprises a row of transducers 14 mounted in a housing 16. Each of the transducers 14 is connected by wires 18 to circuits which are required for inspection. Such circuits are well known to those familiar with this art, do not constitute a part of this invention, and hence will not be described herein. Preferably, such circuits are those described in copending applications "Ultrasonic Defect Signal Discriminator," by Edward M. Nusbickel, and "Ultrasonic Inspection System with Scanned Multiple Transducers," by Russell N. Cressman, Walter J. Bantz, and said Nusbickel. Both of said applications have been filed concurrently herewith.

The housing 16 comprises longitudinal plates 20, end plates 22, and a closed bottom 24. Rotatably mounted on said end plates 22 are wheels 26 for engaging the surface of the plate 10. The housing 16 is rigidly affixed to a vertically disposed plate 28 which is pivotally connected by means of parallel links 30 and 32 to another vertically disposed plate 34 rigidly affixed to a carriage 36. Said links are joined to the plates 28 and 34 by ball joints 38 so that a certain amount of skewing is possible.

The carriage 36 is necessarily moved relative to the plate 10 during inspection, and to this end is provided with front and rear wheels 40 and 42, respectively, affixed to the carriage framework, designated broadly by the numeral 44. The framework 44 is provided with a handle 45 by means of which the carriage 36 can be moved relative to the plate 10.

Disposed in front of and parallel to the housing 16 is a conduit 46 which is supplied with a coupling liquid, e.g. water, by a reservoir such as a storage tank (not shown) mounted on the carriage 36. The conduit 46 is perforated whereby a jet of water continuously is directed toward the space between the closed bottom 24 of the housing 16 and the flat upper surface of the plate 10. Also disposed forward of the housing 16 is a storage tank 48 containing a coupling liquid, said liquid preferably being water. The tank 48 is connected by a flexible conduit 50 to the housing 16. The tank 48 is supplied with water through the line 51.

Referring again to FIG. 1, a transducer 14 is shown inserted through an opening in the upper end of the housing 16 and coupled to a supply of liquid 52, e.g. water, contained in said housing. Any of the liquid 52 which is lost may be replenished by liquid from the tank 48. It is essential that any reflections of ultrasonic energy from the closed bottom 24 that are received, i.e. absorbed, by the transducer 14 be of a magnitude considerably less that that of the minimum expected defect signal. To this end, the closed bottom 24 preferably comprises a thin film 24a of material having an acoustic impedance similar to that of the liquid 52. If said liquid is water, which has an acoustic impedance of 0.149 g./cm.$^2$sec., a preferable material is the rubber sold under the trademark Rho-C and having an acoustic impedance of either 0.146 or 0.151 g./cm.$^2$-sec.

Alternatively, the film may be chosen sufficiently thin relative to the wavelength of the testing ultrasonic energy that the acoustic impedance of the film need not be so close to that of water. For example, if the film is formed of polystyrene, which has an acoustic impedance of 0.255 g./cm.$^2$-sec., the film should have a thickness equal to about one-ninetieth of the wavelength of the ultrasonic energy for the magnitude of the energy reflected from said film to be equal to about 10 percent of the magnitude of the energy reflected from the bottom of the plate 10. This percentage would insure that reflections from said film would cause no false defect signals. As a specific example of this alternative form of the invention, a film of polystyrene 0.0005 inch thick could be used satisfactorily at a testing frequency of 2 MHz.

Figure 2:
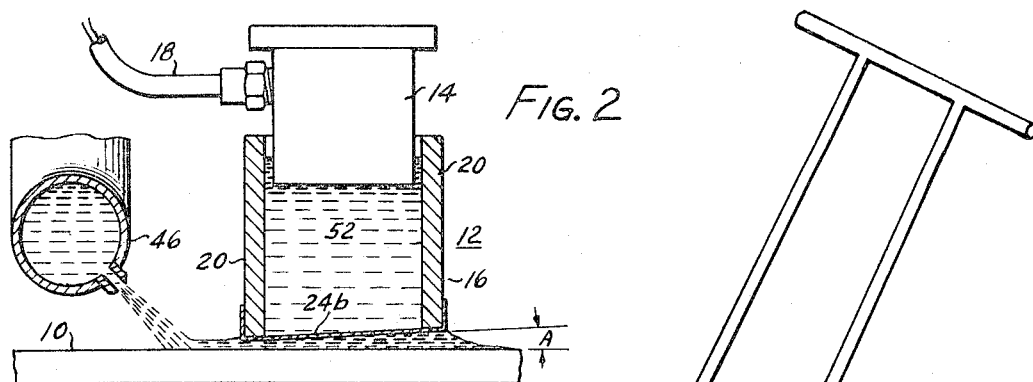
FIG. 2 is a diagrammatic view of an alternative means for containing the column of water through which the ultrasonic energy propagates.

FIG. 2 shows still another form of bottom which can be used for the housing 16. In this embodiment, the film 24b is formed of a material such as polyethylene. The plane of the film is disposed at a small angle A, e.g. 2°, to the horizontal. As a result of this angular disposition the amount of energy reflected from the film and absorbed by the transducer 14 at a testing frequency of 5 MHz. is insufficient to adversely affect the inspection.

As a result of the housing 16 being suspended from the carriage 36 in the above-described manner, as the housing or carriage traverses undulations in the surface of the workpiece the row of transducers 14 is maintained horizontal and transversely disposed to the direction of movement of the carriage relative to the workpiece. In addition, both the transducers 14 and the closed bottom 24 of the housing 16 are maintained at a constant distance from the workpiece, and the vertical axes of the transducers are maintained perpendicular to the surface of that portion of the workpiece being inspected.

As above described, a conduit 46 continuously directs a jet of water toward the space between the closed bottom 24 of the housing 16 and the flat upper surface of the plate 10. The spacing is sufficiently small so that surface tension causes a continuous layer of said water to be maintained in contact with the opposing surfaces of the closed bottom 24 and the flat upper surface of the plate 10.

We claim:

1. In a device for ultrasonically inspecting a relatively wide, substantially flat workpiece wherein said device is moved relative to the surface of said workpiece, the improvement comprising:
    a. at least one transducer adapted to transmit and receive ultrasonic pulses;
    b. a housing for said transducer, said housing having a lower face comprising a substantially flat film, the thickness of said film being much less than the wavelength of said ultrasonic pulses;
    c. a first liquid disposed in said housing in coupling relationship to the transmitting face of said transducer, said liquid being stagnant and supported by said film;
    d. means adapted to supply a second liquid between the surface of said workpiece and said film, the acoustic impedances of said liquids and said film being substantially the same and
    e. means for supporting said housing in relation to said surface such that there is a space between said surface and said film and a continuous layer of said second liquid is maintained in contact with the opposing surfaces of said workpiece and said film.

2. The improvement as recited in claim 1, in which:
    1. said housing contains a plurality of horizontally aligned transducers; and
    2. said first liquid is disposed in coupling relationship to the transmitting faces of each of said transducers.

3. The improvement as recited in claim 1, in which the plane of said film is disposed at an angle relative to the direction of said pulses such that the amplitude of the pulses reflected by said film and received by said transducer is negligible.

4. The improvement as recited in claim 3, in which:
    1. said housing contains a plurality of horizontally aligned transducers; and
    2. said first liquid is disposed in coupling relationship to the transmitting faces of each of said transducers.

* * * * *